(12) United States Patent
Van Buuren

(10) Patent No.: US 11,523,572 B2
(45) Date of Patent: Dec. 13, 2022

(54) HYDROPONICS

(71) Applicant: Eugene Van Buuren, Pretoria (ZA)

(72) Inventor: Eugene Van Buuren, Pretoria (ZA)

( * ) Notice: Subject to any disclaimer, the term of this patent is extended or adjusted under 35 U.S.C. 154(b) by 0 days.

(21) Appl. No.: 17/053,342

(22) PCT Filed: May 7, 2019

(86) PCT No.: PCT/IB2019/053719
§ 371 (c)(1),
(2) Date: Nov. 5, 2020

(87) PCT Pub. No.: WO2019/215600
PCT Pub. Date: Nov. 14, 2019

(65) Prior Publication Data
US 2021/0100180 A1 Apr. 8, 2021

(30) Foreign Application Priority Data

May 7, 2018 (ZA) ................................. 2018/02955

(51) Int. Cl.
*A01G 31/06* (2006.01)
*A01G 7/02* (2006.01)
*A01G 31/00* (2018.01)

(52) U.S. Cl.
CPC ............... *A01G 31/06* (2013.01); *A01G 7/02* (2013.01); *A01G 2031/006* (2013.01)

(58) Field of Classification Search
CPC ........ A01G 31/06; A01G 9/023; A01G 9/022; A01G 27/005
USPC ...................................................... 47/82, 83
See application file for complete search history.

(56) References Cited

U.S. PATENT DOCUMENTS

| 5,251,399 | A | * | 10/1993 | Rasmussen | A01G 9/023 211/88.03 |
| 5,428,922 | A | * | 7/1995 | Johnson | A01G 9/023 47/62 R |
| 5,598,662 | A | * | 2/1997 | Droste | B05B 17/08 47/62 R |
| 5,722,201 | A | * | 3/1998 | Diorio | A01G 27/06 47/79 |
| 8,418,403 | B1 | | 4/2013 | Nuttman | |

(Continued)

FOREIGN PATENT DOCUMENTS

CN 105613248 A 6/2016
KR 101365558 B1 2/2014

OTHER PUBLICATIONS

International Search and Written Opinion dated Sep. 18, 2019 for Intl. Application No. PCT/IB2019/053719, 12 pages.

*Primary Examiner* — Joshua E Rodden
*Assistant Examiner* — Katherine Anne Kloecker
(74) *Attorney, Agent, or Firm* — Casimir Jones SC; Lisa Mueller

(57) ABSTRACT

The invention provides a planter arrangement for hydroponics. The planter arrangement includes a plurality of plant containers arranged side by side, circumferentially about a central axis to define a circular configuration of plant containers. The invention further provides a vertical planter which includes at least two planter arrangements which are stacked in a vertical series such that outlets of plant containers in an upper planter arrangement direct liquid into inlets of plant containers in a lower planter arrangement.

14 Claims, 10 Drawing Sheets

(56) References Cited

U.S. PATENT DOCUMENTS

| | | | |
|---|---|---|---|
| 8,978,300 B2* | 3/2015 | Keats | A01G 9/023 |
| | | | 47/83 |
| 9,374,952 B1 | 6/2016 | Cross | |
| 2009/0151247 A1 | 6/2009 | Kirtz et al. | |
| 2010/0146854 A1 | 6/2010 | Cannon | |
| 2011/0130871 A1* | 6/2011 | Lin | A01G 9/022 |
| | | | 47/79 |
| 2013/0145690 A1 | 6/2013 | Cannon | |
| 2013/0333287 A1* | 12/2013 | Kassouni | A01G 9/023 |
| | | | 47/83 |
| 2015/0342130 A1 | 12/2015 | Prichard | |
| 2018/0332775 A1* | 11/2018 | Kim | A01G 27/008 |
| 2019/0110417 A1* | 4/2019 | Zeng | A01K 63/045 |

* cited by examiner

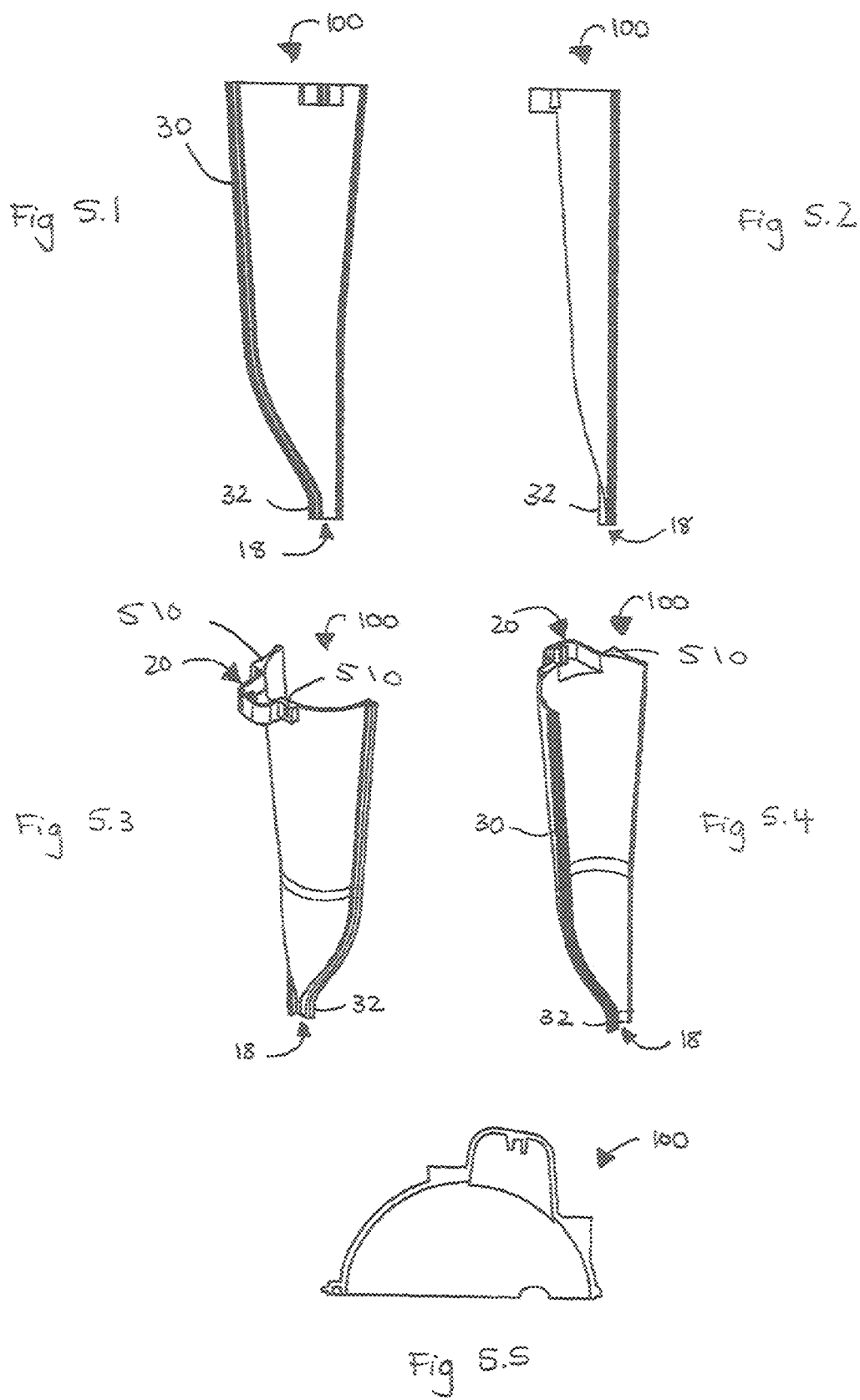

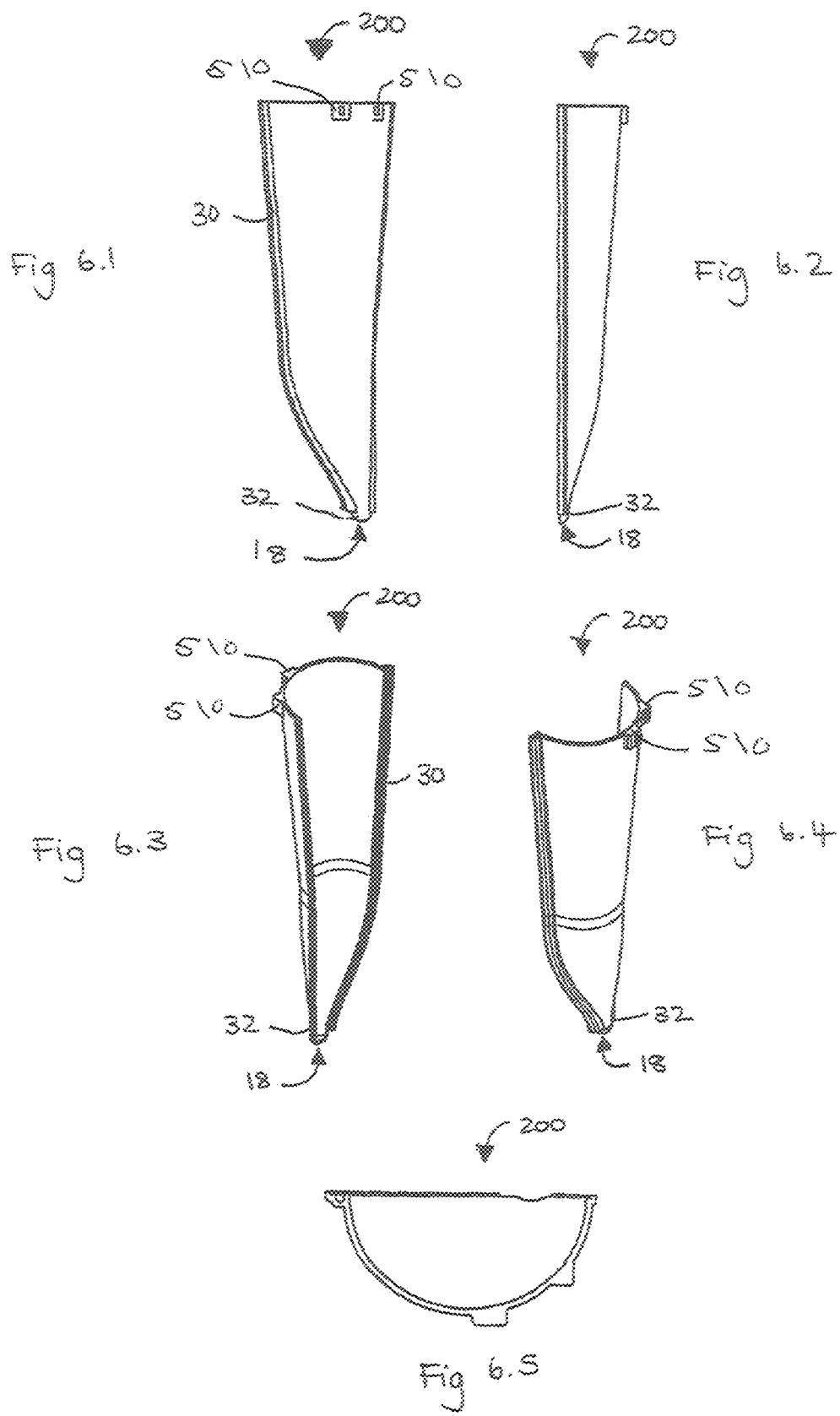

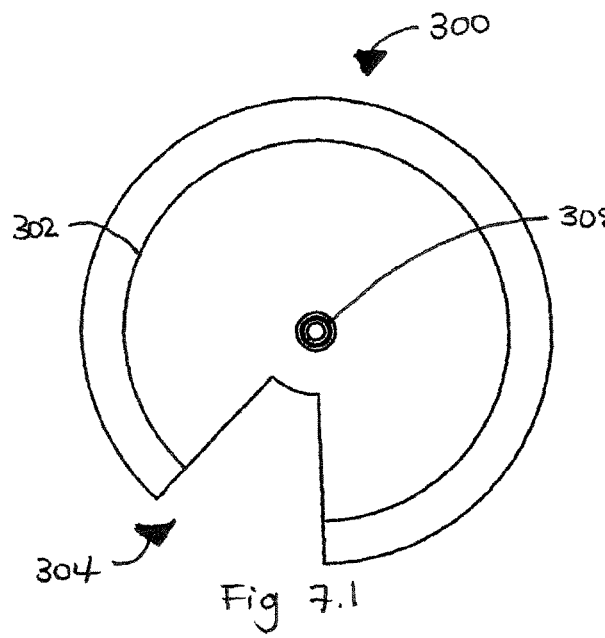
Fig 7.1
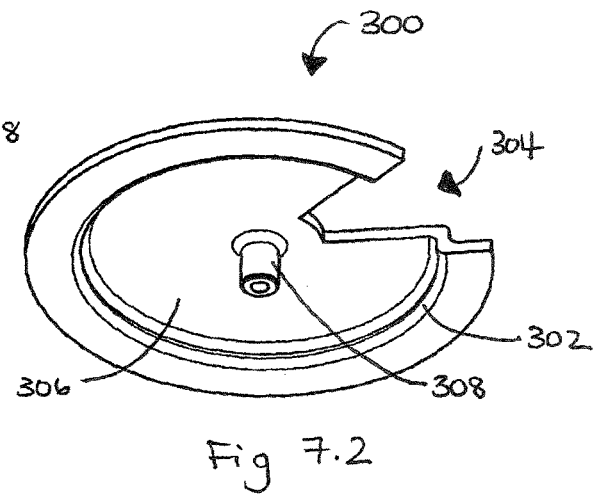
Fig 7.2
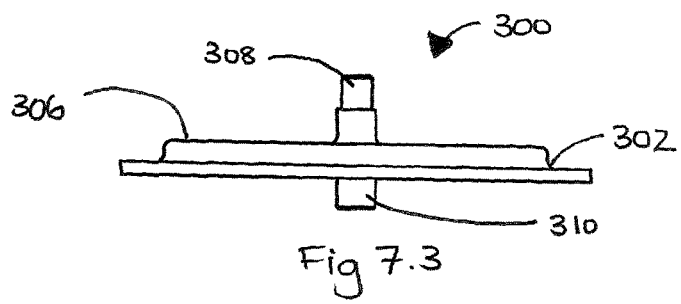
Fig 7.3
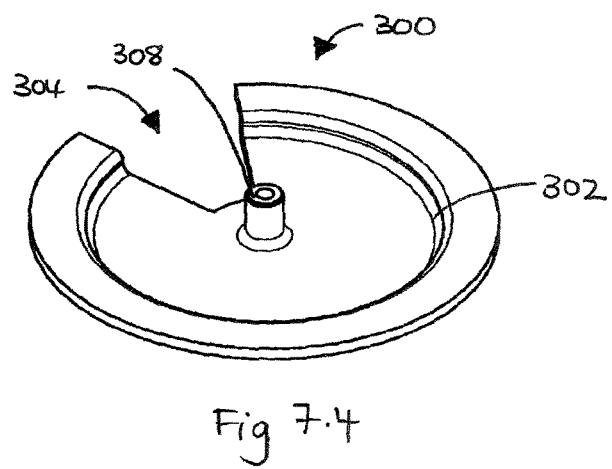
Fig 7.4

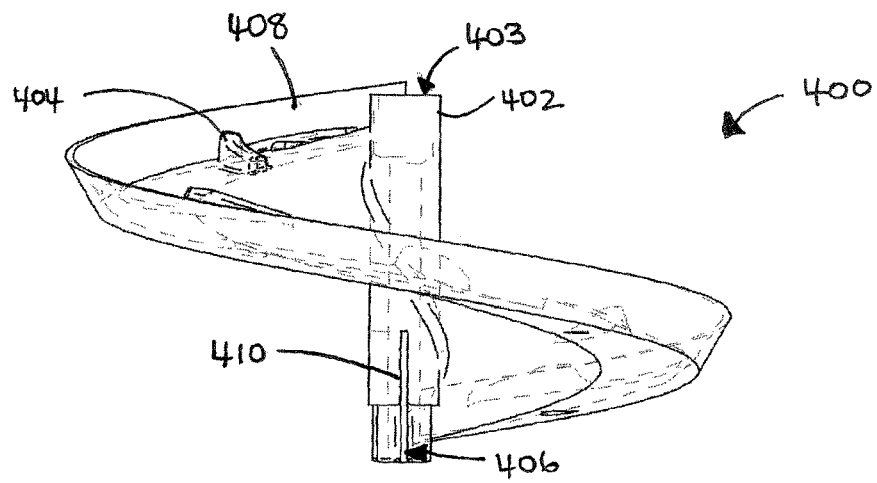
Fig 8.1
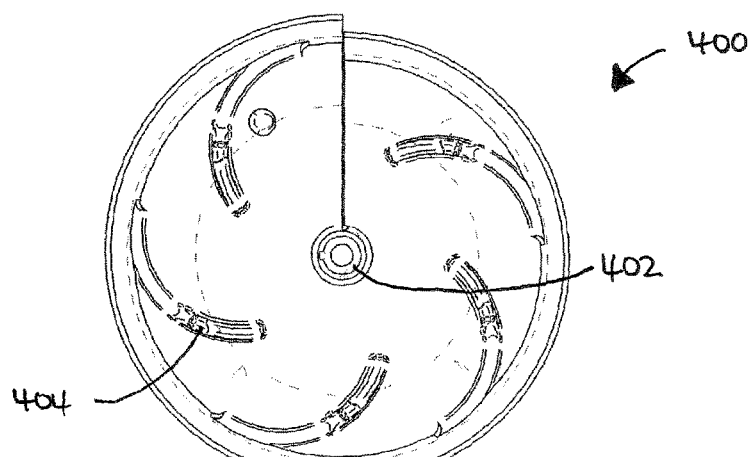
Fig 8.2
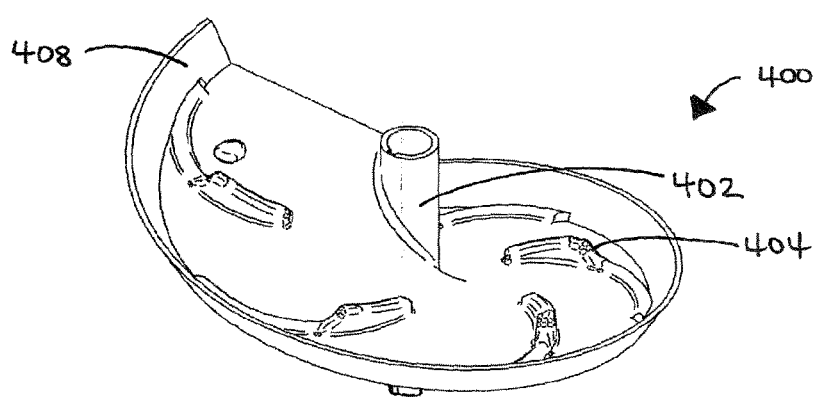
Fig 8.3

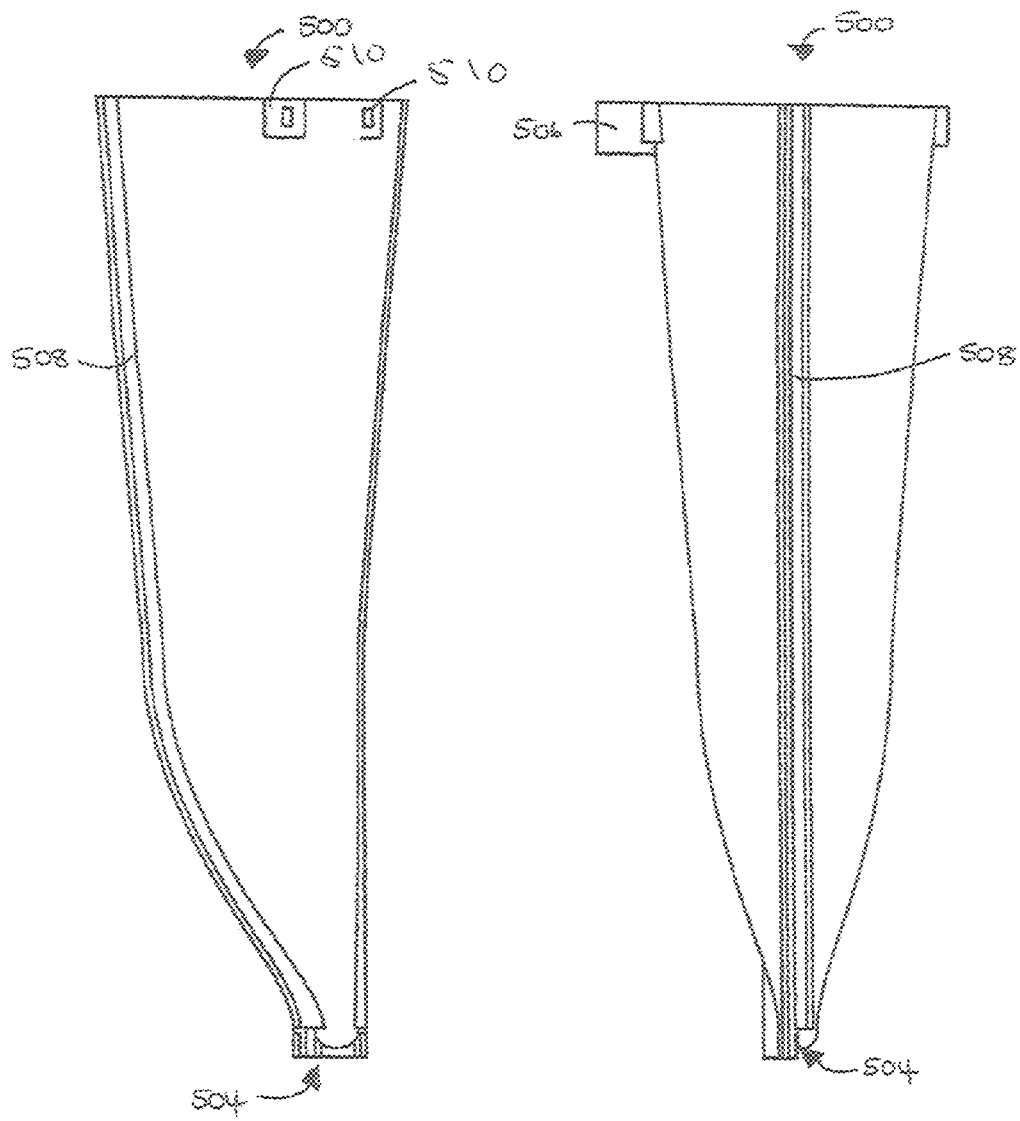
Fig 10.1    Fig 10.2
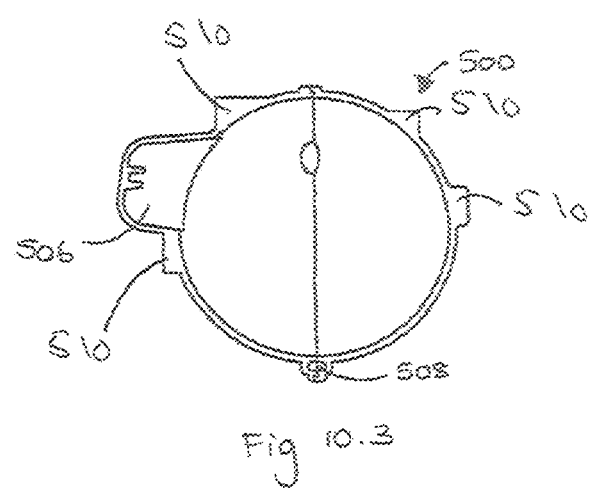
Fig 10.3

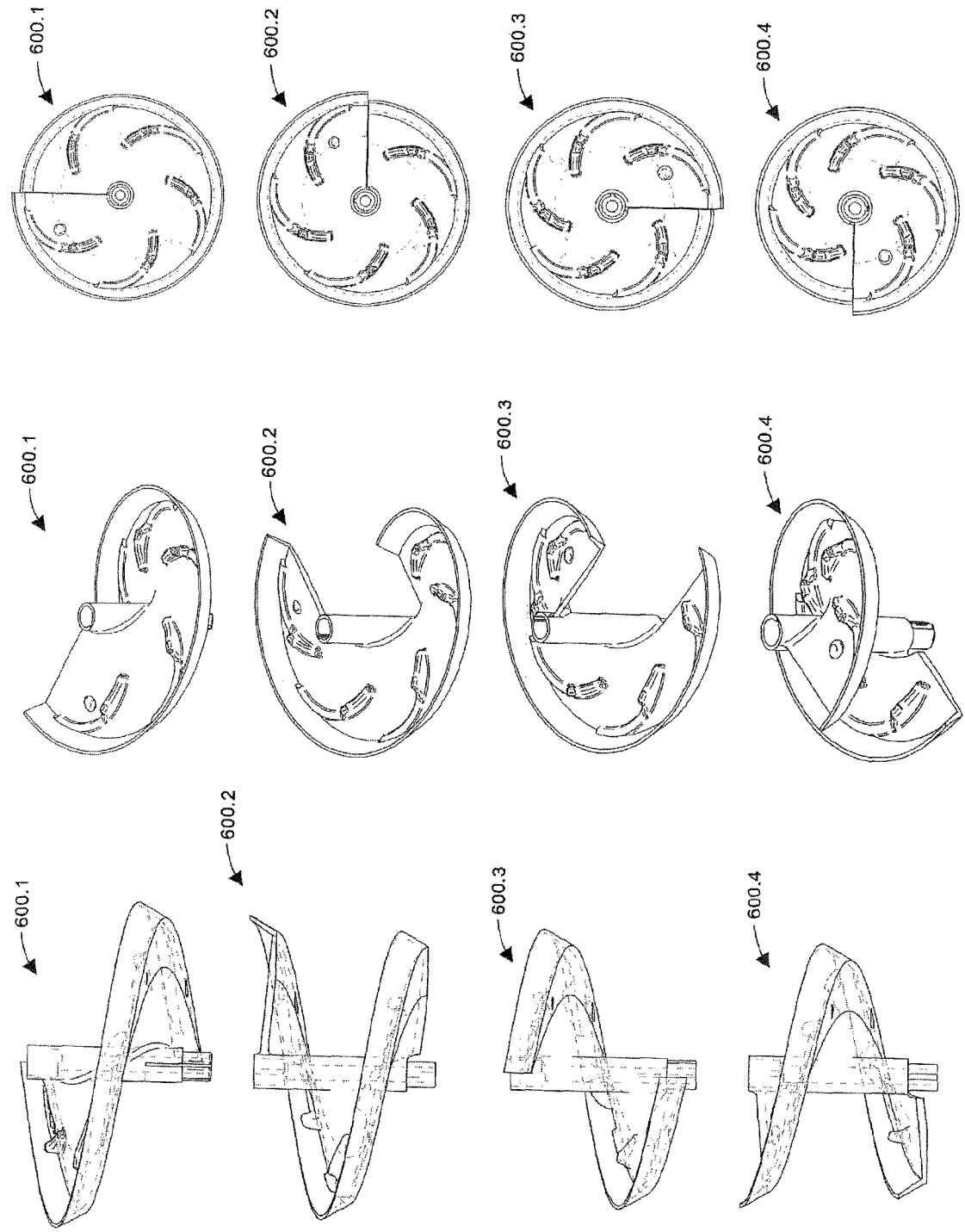

HYDROPONICS

CROSS-REFERENCE TO RELATED APPLICATIONS

This application is a national phase application under 35 U.S.C. § 371 of PCT International Application No. PCT/IB2019/053719, filed May 7, 2019, which claims the benefit of South African Application No. 2018/02955, filed May 7, 2018, each of which are herein incorporated by reference.

FIELD OF THE INVENTION

This invention relates to hydroponics. In particular, the invention relates to a planter arrangement for hydroponics and a vertical planter.

BACKGROUND OF THE INVENTION

The inventor is aware of existing hydroponics arrangements and systems. A major drawback of existing arrangements and systems is that they occupy large amounts of space and require additional room to allow light from a light source to reach the plants.

The inventor is aware of this drawback and aims to provide a solution which provides a more compact hydroponics arrangement and system, allowing an increase in yield for a particular surface area.

SUMMARY OF THE INVENTION

Broadly according to one aspect of the invention, there is provided a planter arrangement for hydroponics which includes
a plurality of plant containers arranged side by side, circumferentially about a central axis to define a circular configuration of plant containers.

The planter arrangement may include a central support arranged on the central axis.

Each plant container of the plurality of plant containers may be defined by a body having an inlet at an operatively upper end of the body for receiving liquid, and an outlet at an operatively lower end of the body, the outlet being in liquid flow communication with the inlet for draining liquid under the force of gravity.

The circular configuration may refer to a circle configuration, a semi-circular configuration, a curved arrangement, an oval arrangement, an arrangement of planters on a circular arc, or the like.

In one embodiment, the plurality of plant containers may be arranged side by side, the plant containers being connected to each other to define the circular configuration. Each plant container of the plurality of plant containers may then include one or more connecting formations (510) positioned on a side of the body for connecting the plant containers to each other. The one or more connecting formations may be in the form of clip connectors, socket and spigot connectors or the like, operable to connect to each other or to a connection arm.

In an example of this specific embodiment, each plant container may include two connecting formations at spaced apart positions on the operatively upper end of the body, in use to connect the plant container to a first adjacent plant container and a second adjacent plant container on opposed sides of the plant container. The connecting formations may be spaced at an obtuse or acute angle, on the plant container, such that connection of multiple plant containers defines a circular configuration in the form of a ring.

In another embodiment, the plurality of plant containers may be arranged side by side in a hub and spoke configuration, wherein the central support forms the hub and each plant container is connected to the hub via a spoke. Each spoke may be in the form of a bar, a rod, a tube or the like. The spokes may be of a predetermined length to accommodate a predetermined number of plant containers in the circular configuration.

In this embodiment, each plant container may include attachment means on an exterior surface of the plant container for attaching the plant container to the spoke. The attachment means may be in the form of a bar, a clip connector, socket and spigot connectors, an adhesive connection, or the like.

Further in this embodiment, each plant container may be connected to one or more adjacent plant containers by means of a connector (510). The connector may be in the form of a clip connector, a socket and spigot connector, a bar connector or the like.

Each plant container of the plurality of plant containers may be tapered.

Each plant container may be shaped and dimensioned to form a conical-shaped container, a horn-shaped container, a square-shaped container, a cylindrical-shaped container or the like. In one example, the body of each plant container may be elongate, tapering to one side on the operatively lower end to form a substantially horn-shaped container. In this example, the outlet may be positioned on a tip of the horn-shape. Advantageously, the horn shape may eliminate any liquid collection points where harmful bacterial can accumulate.

The inlet may include a catchment zone. The catchment zone may be defined by a peripheral extension of the inlet which includes a flange for catching liquid.

Each plant container may include a duct extending along the length of the body, from the operatively upper end to the operatively lower end. In use, the duct may provide a passageway for excess or overflow liquid within the plant container to drain to the outlet.

The outlet may include a protuberance for directing liquid exiting the outlet in a predefined direction. In particular, the protuberance of a first plant container on an upper level may direct liquid to a second plant container on a lower level, the second plant container being angularly (or rotationally) offset along the central axis from the first plant container.

In one embodiment, the body may be of unitary construction. In another embodiment, the body may be manufactured in halves, the halves being joined by means of plastic welding, fusion bonding, solvent bonding, vibration welding, ultrasonic welding or the like, to form a complete body.

The planter arrangement may include root growth shapers (also known as root growth extenders) which are received into the plurality of plant containers. Each root growth shaper may be in the form of a helical blade or an auger-shaped blade around a central shaft. The root growth shaper may include a peripheral seal along its outer edge for creating a liquid seal between the root growth shaper and an inside wall of the plant container. At least one root growth shaper may further include a liquid distribution pattern on the blade of the root growth shaper. In use, the liquid distribution patterns may allow liquid flowing down the blade to be distributed over the width of the blade.

The central shaft of at least one root growth shaper may define a gas conduit and may include a gas outlet. At least one root growth shaper may include connectors for connecting to matched connectors on another root growth shaper. In particular, the top of the central shaft may include a socket into which a spigot of a matched root growth shaper is receivable.

The top of the central shaft may be connectable to a lid connector outlet to defines a fluid conduit for conducting gas. A slit may be provided in the central shaft for expelling an amount of gas carried in the conduit onto the roots. In use, the root growth shaper may comprise a series of root growth shapers, arranged vertically to form a continuous root growth path. For example, the series of root growth shapers may define an elongate helical blade.

It is to be appreciated that the root growth shaper may also be utilised to adjust seedling height of seedlings planted in plant containers.

At least one plant container may include a lid which is receivable on a top portion of the at least one plant container to prevent light or heat entering the at least one plant container. The lid may include a ridge which directs excess liquid to an aperture or cut-out in the lid, in use permitting liquid flowing through the aperture or cut-out into the plant container. The lid of at least one plant container may be connected to the central shaft of a root growth shaper by means of a lid connector. The lid connector may define a conduit connectable to the central shaft of the root growth shaper and to a gas conduit for receiving a supply of gas into the central shaft of the root growth shaper.

The lid may also include a lid connector inlet which is connectable to a minor conduit. The lid may further include a lid connector outlet which is in fluid flow with the lid connector inlet, the lid connector outlet being connectable to a root growth shaper.

The lid may be connected to the root growth shaper on an operatively inner face of the lid to position the root growth shaper in a central position within the plant container.

At least one plant container may have a reflective surface. The reflective surface may be in the form of an applied surface such as a film surface, a coating or the like.

In one example, the plurality of plant containers may include a multiple of three plant containers, such as 3, 6, 9, 12, 15, 18, 21 etc. Preferably, the plurality of plant containers may include twelve plant containers arranged in the ring circular configuration. It is to be appreciated that the number of plant containers may influence the lengths of the spokes and the connectors, the lengths of the spokes and the connectors generally increasing proportionately with the number of plant containers.

According to another aspect of the invention, there is provided a vertical planter which includes at least two planter arrangements, as described, stacked in a vertical series such that an outlet of a plant container in an upper planter arrangement directs liquid into an inlet of a plant container in a lower planter arrangement.

A vertical planter as described, wherein the upper planter arrangement may be angularly offset from the lower planter arrangement about the central support such that in use, liquid from the plant container in the upper planter arrangement may cascade via an outlet into an inlet of the plant container in the lower planter arrangement.

The at least two planter arrangements may be angularly offset from each other such that each plant container in the upper planter arrangement is positioned offset from the plant containers in the lower planter arrangement, in use to provide a growth space for plants to grow in the plant containers in the lower planter arrangement.

In a preferred embodiment, the at least two planter arrangements may be stacked in a vertical series by attaching each planter arrangement to the central support. Each planter arrangement may be attached to the central support by means of attachment means in the form of spokes or the like, which extend from the central support to each plant container.

In another embodiment, the at least two planter arrangements may be stacked in the vertical series by standing the upper planter arrangement on the lower planter arrangement. In this embodiment, bases of the plurality of plant containers of the upper planter arrangement rest on lids of the plurality of plant containers of the lower planter arrangement, such that outlets of plant containers in the upper planter arrangement direct fluid to inlets of plant containers in the lower planter arrangement.

The vertical planter may include at least one central light source. The central light source may be attached to the central support, at least partly along the length of the central support. The at least one central light source may be attached to the central support between the spokes extending from the central support. The central light source may include a controller to provide a programmable light source. In particular, the programmable light source may be in the form of one or more programmable light-emitting diodes (LEDs), the one or more programmable LEDs changing colour and/or intensity of light emitted in accordance with the need of a plant stage of plants in the plant containers.

The central support may define a central gas conduit. The central gas conduit may include apertures, in use for allowing small amounts of gas to exit the conduit towards the plurality of plant containers. In use, gas exiting the central gas conduit via the apertures surrounds plants in the plurality of plant containers to facilitate gas exchange on leaves of plants, as well as to facilitate carbon dioxide ($CO_2$) enrichment for flowers of plants.

The planter arrangement may include conduits connected in fluid flow to the central support and to the lid connectors. Each conduit may lead into four minor conduits, all of which may be in fluid communication with each other.

It is to be appreciated that once plants in the plant containers reach maturity, the plants may fill the growth space between planter arrangements such that the vertical planter forms a flue. In use, gas exiting the apertures of the central gas conduit gradually warms, the warmed gas rising until it exits the vertical planter at a top of the planter.

The spokes may be in the form of pipes connected to the central gas conduit in gas communication, the pipes extending to the plurality of plant containers such that gas may enter the plurality of plant containers.

The gas may be in the form of air, an optimised blend of gases for a particular plant stage, or the like. The gas may be compressed, cooled or the like. The gas circulation system may include a compressor.

The vertical planter may include a fluid circulation system. The fluid circulation system may circulate fluid from a reservoir at a bottom of the vertical planter to a top of the vertical planter, with fluid being evenly distributed between plant containers of an uppermost planter arrangement. The fluid circulation system may include a pump for pressurising fluid to circulate to the top of the vertical planter. The fluid circulation system may include cooling means for cooling the fluid in the reservoir. The fluid circulation system may further include aeration means for aerating the fluid in the reservoir.

In a preferred embodiment, the fluid may be in the form of water containing nutrients. In this embodiment, the fluid circulation system may include mixing means for high speed mixing of the fluid as it is being cooled and aerated in the reservoir, the mixing ensuring even distribution of temperature, gas and nutrients in the water.

The vertical planter may include an electroacoustic transducer for emitting sounds in accordance with a plant stage of plants in the plant containers. In particular, the electroacoustic transducer may emit an "A" musical note to stimulate plant growth.

The invention is now described, by way of non-limiting example, with reference to the accompanying figures.

FIGURE(S)

In the figure(s):

Figure 4:
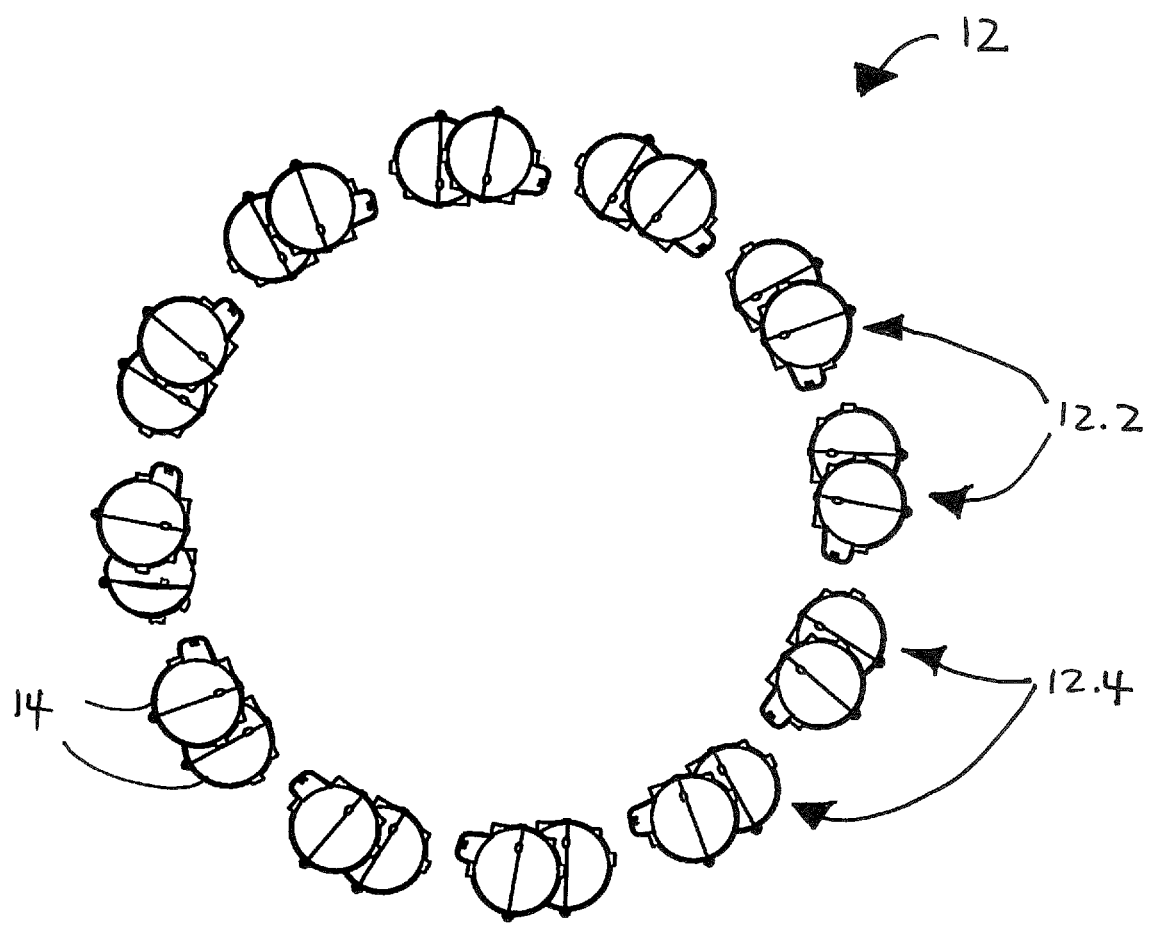
Figure 9:
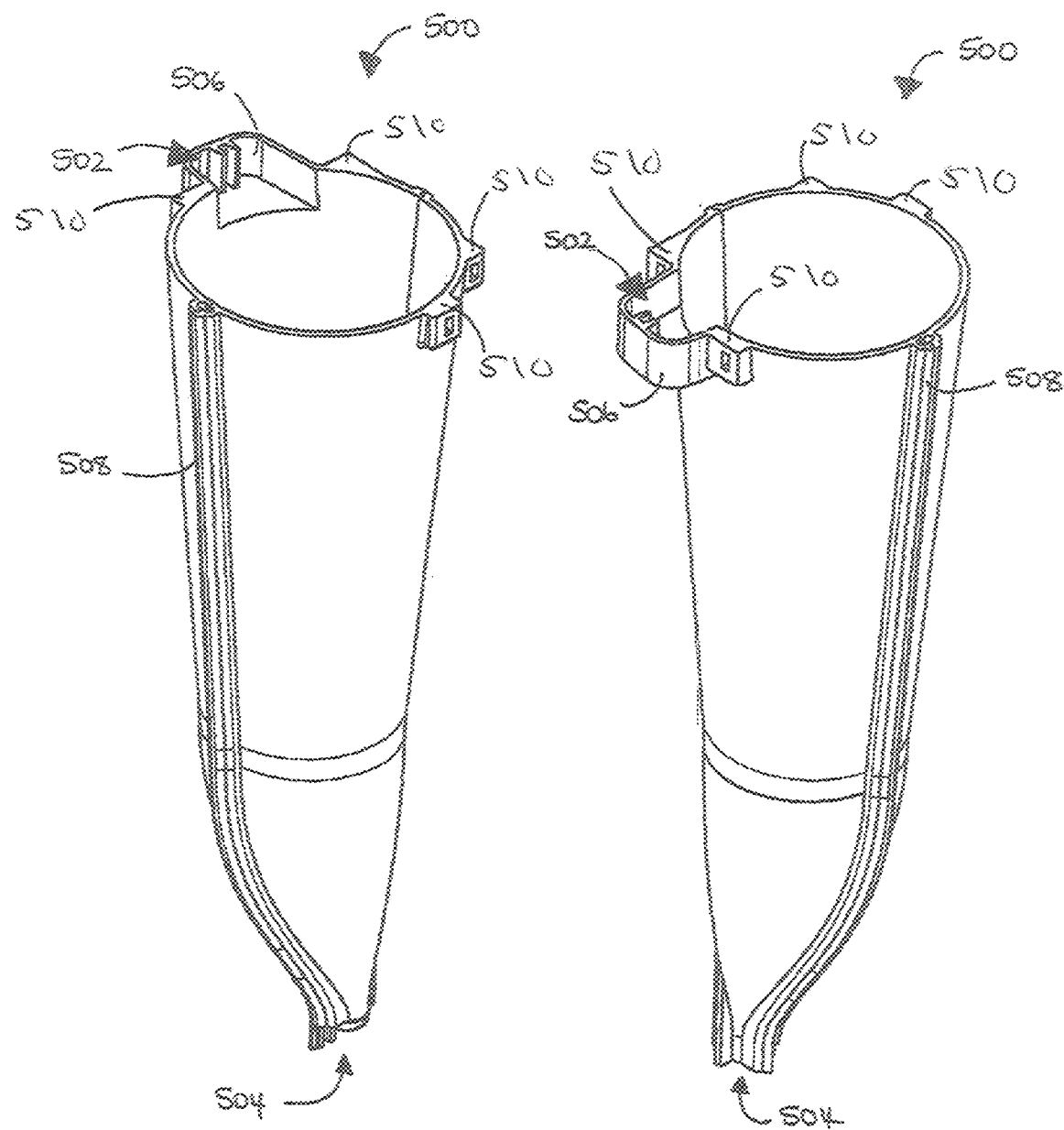

FIG. 4 a top view of a planter arrangement, in accordance with another aspect of the invention;

FIG. 5 shows various views of a first example of one half of a plant container;

FIG. 6 shows various views of the other half of the plant container shown in FIG. 5;

FIG. 7 shows various views of an example of a lid;

FIG. 8 shows various views of a first example of a root growth shaper;

FIG. 9 shows three-dimensional views of another example of a plant container;

FIG. 10 shows side views of the two halves of the plant container shown in FIG. 9, as well as a top view of the plant container of FIG. 9; and FIG. 11 shows various views of other examples of root growth shapers, intended to be used together.

In the figures, like reference numerals denote like parts of the invention unless otherwise indicated.

EMBODIMENT OF THE INVENTION

Figure 1:
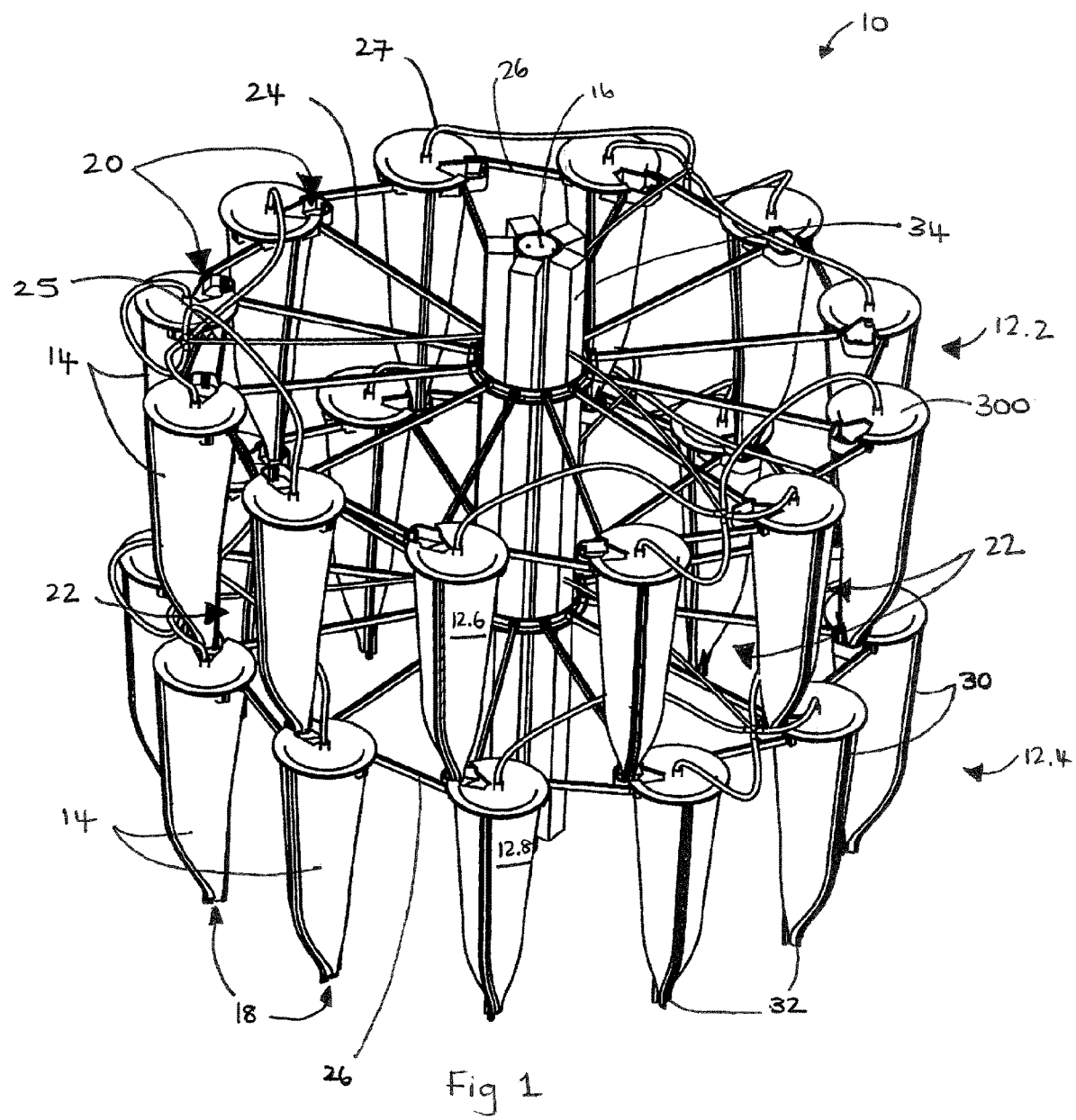
FIG. 1 shows a three-dimensional view of a vertical planter, in accordance with one aspect of the invention.
Figure 2:
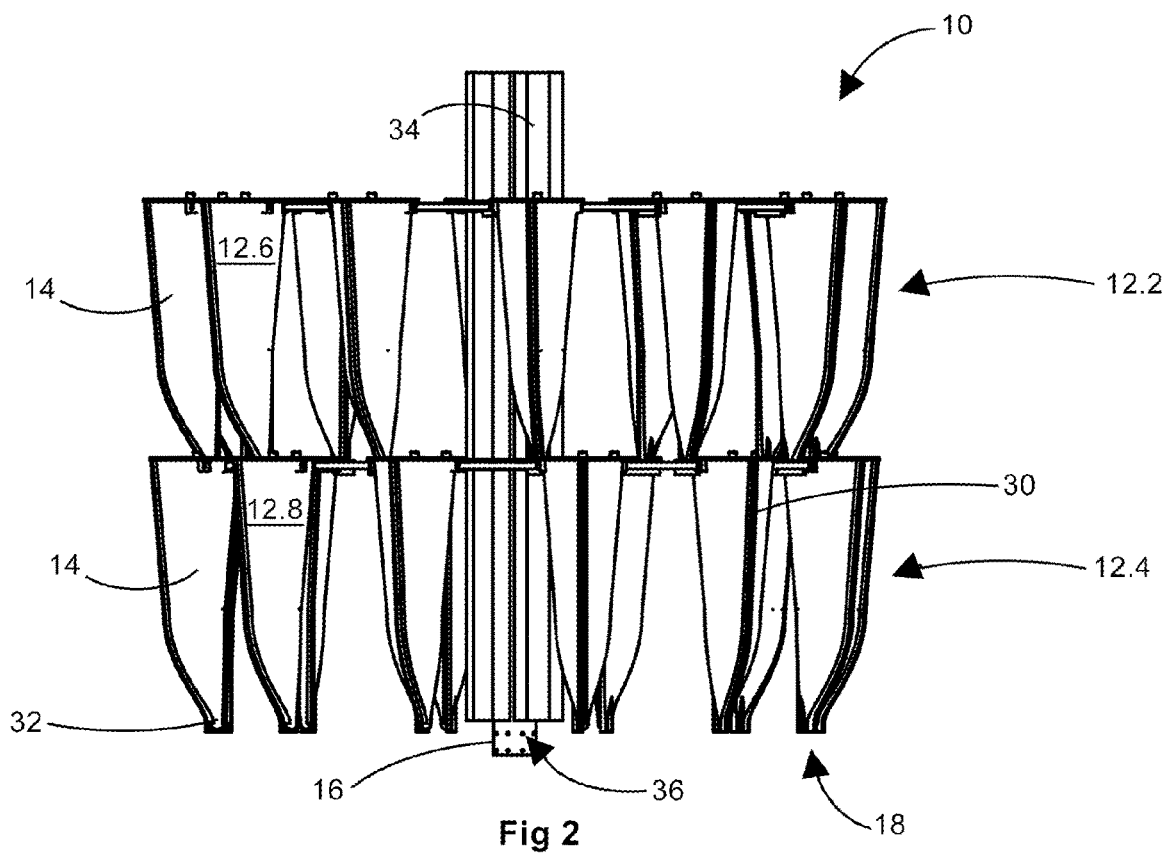
FIG. 2 shows a side view of the vertical planter of FIG. 1.
Figure 3:
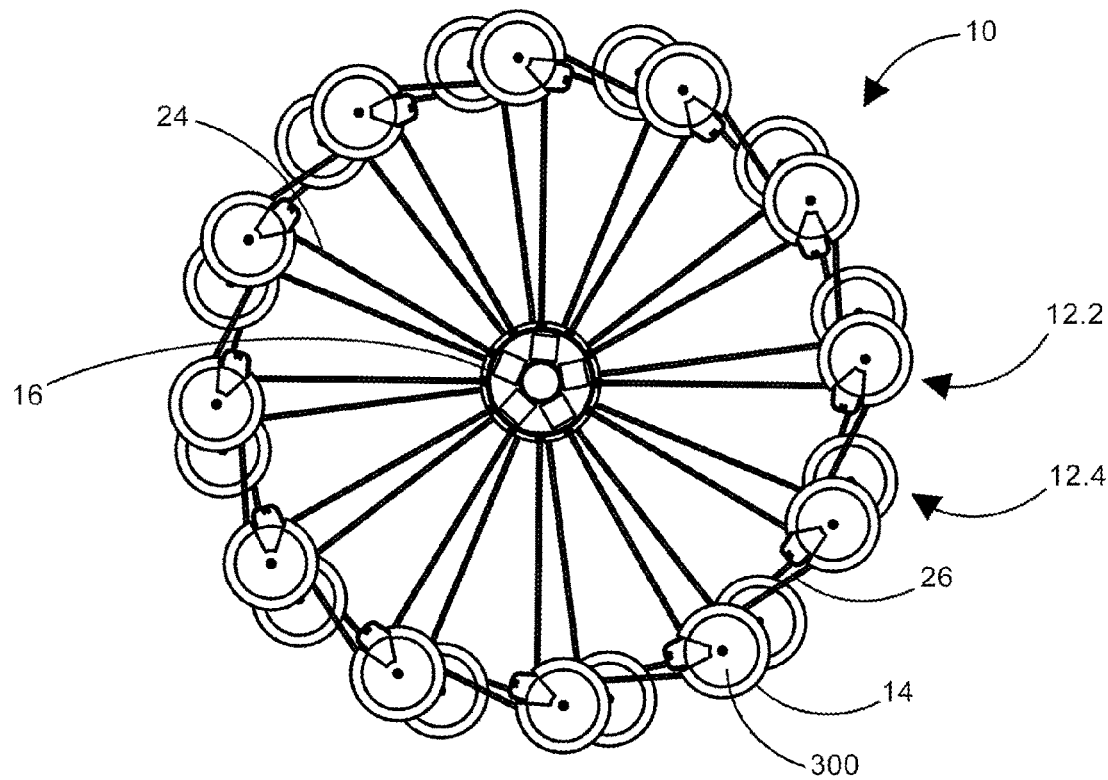
FIG. 3 shows a top view of the vertical planter of FIG. 1.

In FIGS. 1 to 3, a vertical planter (10), in accordance with one aspect of the invention, is shown. The vertical planter (10) includes at least two planter arrangements (12) which are stacked in a vertical series.

The two planter arrangements (12) are provided for in accordance with another aspect of the invention, in which the planter arrangements (12) for hydroponics includes a plurality of plant containers (14) arranged side by side, circumferentially about a central support (16) to define a circular configuration of plant containers (14). Another example of a planter arrangement is shown in FIG. 4. Both planter arrangements (12) include twelve plant containers (14) each arranged in a ring circular configuration.

It is to be appreciated that although the circular configuration shown in FIGS. 1 to 4 is circular, the circular configuration can also be in the form of a semi-circular configuration, a curved arrangement, an oval arrangement or an arrangement of planters on a circular arc (not shown).

As best shown in FIGS. 1 and 3 specifically, the two planter arrangements (12) are stacked in a vertical series such that an outlet (18) of a plant container (14) in an upper planter arrangement (12.2) directs liquid into an inlet (20) of a plant container (14) in a lower planter arrangement (12.4). Specifically, the upper planter arrangement (12.2) is angularly offset from the lower planter arrangement (12.4) about the central support such that in use, liquid from the plant container (14) in the upper planter arrangement (12.2) cascades via an outlet (18) into an inlet (20) of the plant container (14) in the lower planter arrangement (12.4).

Furthermore, the planter arrangements (12) are angularly offset from each other such that each plant container (14) in the upper planter arrangement (12.2) is at an offset angle relative to the two plant containers (14) in the lower planter arrangement (12.4), in use to provide a growth space (22) for plants to grow in the plant containers (14) in the lower planter arrangement (12.4).

As shown in FIGS. 1 to 3, the planter arrangements (12) are stacked in a vertical series by attaching each planter arrangement (12) to the central support (16). Each planter arrangement (12) is attached to the central support (16) by means of attachment means (24) in the form of spokes. The spokes (24) extend from the central support (16) to each plant container (14). Central conduits (25) extend from the central support (16), each of which leads into four minor conduits (27), all of which are in fluid communication with each other.

As described, the plant containers (14) are arranged side by side in a hub and spoke configuration, wherein the central support (16) forms the hub and each plant container (14) is connected to the hub (16) via a spoke (24). Each plant container (14) therefore includes attachment means for attaching the plant container (14) to the spoke (24), the attachment means being on an exterior surface of the plant container (14) (not shown). The attachment means can be in the form of a bar, a clip connector, socket and spigot connectors or an adhesive connection.

Each plant container (14) is also connected to both adjacent plant containers by means of a connector (26) in the form of a bar connector.

In the example shown in FIG. 4, the plant containers (14) are arranged side by side and are connected to each other to define the circular configuration. As can be seen in FIG. 4, the plant containers (14) in the vertical series are stacked on top of each other.

Each plant container (14) is defined by a body having the inlet (20) in an operatively upper end of the body for receiving liquid, and the outlet (18) in an operatively lower end of the body, the outlet (18) being in liquid flow communication with the inlet (20) for draining liquid. In use, liquid flows from the inlet (20) to the outlet (18) under the force of gravity.

FIGS. 5 and 6 show various views of an example of the body which is manufactured in halves, with FIG. 5 showing one half (100) of the plant container (14) and FIG. 6 showing the other half (200) of the plant container (14). The halves (100, 200) are joined by means of solvent bonding to form a complete body.

Each plant container (14) is tapered. Specifically, the body of each plant container (14) is elongate and tapers to one side on the operatively lower end to form a substantially horn-shaped container (14). As shown, the outlet (18) is positioned on a tip of the horn-shape.

The inlet (20) includes a catchment zone, which is defined by a peripheral extension of the inlet (20) and includes a flange for catching liquid.

Each plant container (14) also includes a duct (30) which extends along the length of the body, from the operatively upper end to the operatively lower end. In use, the duct (30) provides a passageway for excess or overflow liquid within the plant container (14) to drain to the outlet (18).

The outlet (18) has a protuberance (32) for directing liquid exiting it in a predefined direction. In particular, the protuberance (32) of a first plant container (12.6) on an upper level (12.2) directs liquid to a second plant container (12.8) on a lower level (12.4), the second plant container (12.8) being angularly (or rotationally) offset from the first plant container (12.6).

Referring specifically to FIGS. 9 and 10, features of the plant container (500) is shown in more detail. As can be seen, this plant container (500) is defined by a body which tapers to one side to form a horn-shape. The body has an inlet (502) in an operatively upper end of the body for receiving liquid, and an outlet (504) in an operatively lower end of the body, at the tip of the horn-shape, which is in liquid communication with the inlet (502). The inlet (502) has a catchment zone (506) for catching liquid and directing it to the inlet (502). This plant container (500) has a duct (508) for passageway of overflow liquid from the inlet (502) to the outlet (504).

As best illustrated in FIG. 7, each plant container (14) includes a lid (300) which is receivable by the inlet (20) to prevent light or heat entering the plant container (14). The lid (300) has a ridge (302) which directs excess liquid to a cut-out (304) in the lid (300). Liquid which flows through the cut-out (304) results in the plant container (14) the lid (300) is received by. The lid (300) is provided with a lid connector inlet (308), which is connectable to the minor conduit (27). The lid also includes a lid connector outlet (310), in fluid flow with the lid connector inlet (308), which is connectable to a root growth shaper (400) (see FIG. 8).

Each plant container can also receive a root growth shaper (400) which is generally helical blade or auger-shaped (see FIG. 8). The root growth shaper includes a central shaft (402), as well as a plurality of liquid distribution patterns (404) on a blade of the root growth shaper (400). In use, the liquid distribution patterns (404) allow liquid flowing down the blade to be distributed over the surface of the blade. The root growth shaper (400) also includes a peripheral seal (408) in the form of a lid for sealing onto the inside of the plant container (14). The top of the central shaft (402) is provided with a socket (403) into which a spigot (406) of a matched root growth shaper is receivable. The top of the central shaft (402) is connectable to a lid connector outlet (310) and defines a fluid conduit for conducting gas. A slit (410) is provided into the central shaft (402) for expelling an amount of gas carried in the conduit. In use, the root growth shaper (400) comprises a series of root growth shapers (400), arranged vertically to form a continuous root growth path (also not shown). However, it is to be appreciated that the root growth shaper (400) can also be utilised to adjust seedling height of seedlings planted in plant containers (14). The root growth shaper (400) is also referred to as a root growth extender as by shaping the root, the root growth shaper (400) effectively extends the length of the root to increase root surface area for increased nutrient and/or water uptake. The slits (410) in the central shafts (402) of the root growth shapers expel gas onto the roots of plants growing on the root shaper.

In FIG. 11, other examples of root growth shapers (600) are shown which are intended to be used together as a series of root growth shapers arranged vertically to form a continuous root growth path. In particular, the root growth shapers (600) are intended to be arranged in the following vertical order, from top to bottom: 600.1, 600.2, 600.3 and 600.4 in a single plant container (14). The root growth shapers (600.1-600.4) have reduced diameters to fit into the horn-shaped plant container (500). The diameters of the root growth shapers (600.1-600.4) are matched to the shape of the plant container (14) with the diameter of 600.1 being the largest and the diameter of 600.4 being the smallest.

As described above, the lid (300) is connected to the root growth shaper (400) by means of the lid connector outlet (310) on an operatively inner face (306) of the lid (300), to position the root growth shaper (400) in a central position within the plant container (14) (not shown).

Each plant container (14) also has a reflective surface in the form of an applied surface, specifically a reflective coating (not shown).

The vertical planter (10) can further include multiple features which are not shown in their entirety, including a central light source (34), a gas circulation system, a fluid circulation system and an electroacoustic transducer.

The central light source (34) is attached to the central support (16) along the length of the central support (16), between the spokes. It has a controller which provides a programmable light source (34) in the form of six programmable light-emitting diodes (LEDs) which can change colour and/or intensity of light emitted in accordance with the need of a plant stage of plants in the plant containers (14).

The gas circulation system circulates gas through the central support (16), such that the gas cools the central support (16) and in turn, the light source (34) attached to the central support (16). As such, the central support (16) defines a central gas conduit. This central gas conduit (17) has apertures (36) for allowing small amounts of gas to exit the conduit (16) towards the plurality of plant containers (14). In use, gas exiting the central gas conduit (17) via the apertures (36) surrounds plants in the plant containers (14) to facilitate gas exchange on leaves of plants, as well as to facilitate carbon dioxide ($CO_2$) enrichment for flowers of plants.

Once plants in the plant containers (14) reach maturity, the plants may fill the growth space (22) between planter arrangements (12) such that the vertical planter (10) forms a flue. In use, gas exiting the apertures (36) of the central gas conduit (17) gradually warms, the warmed gas rising until it exits the vertical planter (10) at a top of the planter (10).

When the vertical planter (10) includes the gas circulation system, the central conduits (25) connected to the central support (26) conduct gas to the minor conduits (27) and into the planters via the lid connector inlet (308) through the central shaft (402) and onto the roots of the plants. The gas is in the form of air which is compressed and cooled by a compressor.

The fluid circulation system circulates fluid from a reservoir at a bottom of the vertical planter (10) to a top of the vertical planter (10), with fluid being evenly distributed between plant containers (14) of an uppermost planter arrangement. The fluid circulation system includes a pump for pressurising fluid to circulate to the top of the vertical planter (10), as well as cooling means for cooling the fluid in the reservoir. The fluid circulation system further includes aeration means for aerating the fluid in the reservoir. As the fluid is in the form of water containing nutrients, the fluid circulation system also include mixing means for high speed mixing of the fluid as it is being cooled and aerated in the reservoir, the mixing ensuring even distribution of temperature, gas and nutrients in the water.

The electroacoustic transducer emits sounds in accordance with a plant stage of plants in the plant containers (14). In particular, the electroacoustic transducer may emit an "A" musical note to stimulate plant growth.

The inventor believes that the invention provides a novel planter arrangement for hydroponics, as well as a novel vertical planter, which reduces the space required for hydroponics systems and increases the yield produced from a particular surface area.

The invention claimed is:

1. A planter arrangement for hydroponics which includes
a plurality of plant containers, each plant container defined by a body having an inlet at an operatively upper end of the body for receiving liquid, and an outlet at an operatively lower end of the body, the outlet being in liquid flow communication with the inlet for draining liquid under the force of gravity,
the plurality of plant containers arranged side by side, circumferentially about a central axis to define a circular configuration of plant containers, the circular configuration being selected from any one of: a semi-circular configuration, a curved arrangement, an oval arrangement and an arrangement of planters on a circular arc,
the plant containers being connected to each other to define the circular configuration, each plant container including one or more connecting formations positioned on a side of the body for connecting the plant containers to each other; and
a central support arranged on the central axis,
wherein each plant container includes two connecting formations at spaced apart positions on the operatively upper end of the body of the plant container, in use to connect the plant container to a first adjacent plant container and a second adjacent plant container on spaced apart sides of the plant container, the two connecting formations spaced at an obtuse angle or an acute angle on the plant container, such that connection of multiple plant containers defines a circular configuration in the form of a ring.

2. The planter arrangement of claim 1, in which the one or more connecting formations are in the form of any one or more of: clip connectors and socket and spigot connectors, operable to connect to each other or to a connection arm.

3. The planter arrangement of claim 1, in which the plurality of plant containers is arranged side by side in a hub and spoke configuration, wherein the central support forms the hub and each plant container is connected to the hub via a spoke.

4. The planter arrangement of claim 1, in which each plant container of the plurality of plant containers is any one of: tapered, conical-shaped, horn-shaped, square-shaped and cylindrical-shaped.

5. The planter arrangement of claim 1, in which the inlet includes a catchment zone which is defined by a peripheral extension of the inlet and a flange for catching liquid.

6. The planter arrangement of claim 5, in which each plant container includes a duct extending along the length of the body, from the operatively upper end to the operatively lower end, in use to provide a passageway for excess or overflow liquid within the plant container to drain to the outlet.

7. The planter arrangement of claim 1, which includes root growth shapers which are received into the plurality of plant containers, each root growth shaper is in the form of any one of: a helical blade or an auger-shaped blade, around a central shaft, with at least one root growth shaper including a peripheral seal along its outer edge for creating a liquid seal between the root growth shaper and an inside wall of the plant container.

8. The planter arrangement of claim 7, in which the central shaft of at least one root growth shaper defines a gas conduit and at least one gas outlet.

9. A vertical planter which includes
at least two planter arrangements of claim 7, stacked in a vertical series such that in use, outlets of plant containers in an upper planter arrangement direct liquid into inlets of plant containers in a lower planter arrangement.

10. The vertical planter of claim 9, in which the upper planter arrangement is angularly offset from the lower planter arrangement about the central support, such that in use, liquid from the plant container in the upper planter arrangement cascades via the outlet into the inlet of the plant container in the lower planter arrangement.

11. The vertical planter of claim 9, in which the at least two planter arrangements are stacked in the vertical series by attaching each planter arrangement to the central support by means of spokes which extend from the central support to each plant container.

12. The vertical planter of claim 9, in which the at least two planter arrangements are stacked in the vertical series by standing the upper planter arrangement on the lower planter arrangement, resting bases of the plurality of plant containers of the upper planter arrangement on lids of the plurality of plant containers of the lower planter arrangement, such that outlets of plant containers in the upper planter arrangement direct fluid to inlets of plant containers in the lower planter arrangement.

13. The vertical planter of claim 9, which includes at least one central light source attached to the central support.

14. The vertical planter of claim 9, in which the central support defines a central gas conduit having apertures, in use for allowing small amounts of gas to exit the central gas conduit towards the plurality of plant containers.

* * * * *